US009043846B2

(12) United States Patent
Cline et al.

(10) Patent No.: US 9,043,846 B2
(45) Date of Patent: May 26, 2015

(54) INFLIGHT ENTERTAINMENT SYSTEM WITH SELECTIVELY PRELOADED SEAT END VIDEO CACHES

(75) Inventors: Douglas Cline, Long Beach, CA (US); Gregory C. Petrisor, Los Angeles, CA (US)

(73) Assignee: Lvmexis Corporation, Irvine, CA (US)

( * ) Notice: Subject to any disclaimer, the term of this patent is extended or adjusted under 35 U.S.C. 154(b) by 327 days.

(21) Appl. No.: 13/599,128

(22) Filed: Aug. 30, 2012

(65) Prior Publication Data

US 2013/0055321 A1  Feb. 28, 2013

Related U.S. Application Data

(60) Provisional application No. 61/575,849, filed on Aug. 30, 2011.

(51) Int. Cl.
| | |
|---|---|
| H04N 7/173 | (2011.01) |
| H04N 7/16 | (2011.01) |
| H04N 21/214 | (2011.01) |
| H04N 21/258 | (2011.01) |
| H04N 21/414 | (2011.01) |
| H04N 21/432 | (2011.01) |
| H04N 21/442 | (2011.01) |
| H04N 21/6543 | (2011.01) |
| G06F 17/40 | (2006.01) |

(52) U.S. Cl.
CPC ..... *H04N 21/2146* (2013.01); *H04N 21/25891* (2013.01); *H04N 21/41422* (2013.01); *H04N 21/4325* (2013.01); *H04N 21/44209* (2013.01); *H04N 21/6543* (2013.01)

(58) Field of Classification Search
USPC .......................... 725/75, 76–77, 46; 370/237
See application file for complete search history.

(56) References Cited

U.S. PATENT DOCUMENTS

| | | | | |
|---|---|---|---|---|
| 5,610,822 | A * | 3/1997 | Murphy | 701/468 |
| 5,758,257 | A * | 5/1998 | Herz et al. | 725/116 |
| 6,614,987 | B1 * | 9/2003 | Ismail et al. | 386/291 |
| 6,810,527 | B1 * | 10/2004 | Conrad et al. | 725/76 |
| 7,587,733 | B2 * | 9/2009 | Keen et al. | 725/76 |
| 2008/0141315 | A1 * | 6/2008 | Ogilvie | 725/77 |
| 2010/0192219 | A1 * | 7/2010 | Carvajal et al. | 726/19 |
| 2011/0099071 | A1 * | 4/2011 | Johnson | 705/14.64 |
| 2011/0219409 | A1 * | 9/2011 | Frisco et al. | 725/77 |
| 2012/0137325 | A1 * | 5/2012 | Ogilvie | 725/38 |
| 2012/0190386 | A1 * | 7/2012 | Anderson | 455/456.3 |
| 2012/0298737 | A1 * | 11/2012 | Thakar et al. | 235/375 |

(Continued)

*Primary Examiner* — Pankaj Kumar
*Assistant Examiner* — Reuben M Brown
(74) *Attorney, Agent, or Firm* — Scot A. Reader

(57) ABSTRACT

An inflight entertainment (IFE) system preloads from head end equipment onto seat end video caches subsets of prerecorded video entertainment programs from a library of prerecorded video entertainment programs stored on the head end equipment. Preloading is done independent of play requests made by passengers using the IFE system. The selected subsets are selected using selection metrics such as program popularity, passenger demographics and/or passenger preferences. The same or a different subset may be selected for different passengers. As a result of the selective preloading of the seat end video caches, if the head end equipment or the distribution system becomes inoperable during the flight, the IFE system is able to continue to deliver a limited offering of popular, demographically indicated and/or passenger preferred video entertainment from the seat end video caches, without requiring a large multiplier in storage capacity or loading time.

20 Claims, 7 Drawing Sheets

(56) References Cited

U.S. PATENT DOCUMENTS

| | | | |
|---|---|---|---|
| 2012/0324522 A1* | 12/2012 | Malik | 725/114 |
| 2013/0055321 A1* | 2/2013 | Cline et al. | 725/77 |
| 2013/0086197 A1* | 4/2013 | Ho et al. | 709/212 |
| 2014/0223478 A1* | 8/2014 | Ogilvie | 725/38 |

* cited by examiner

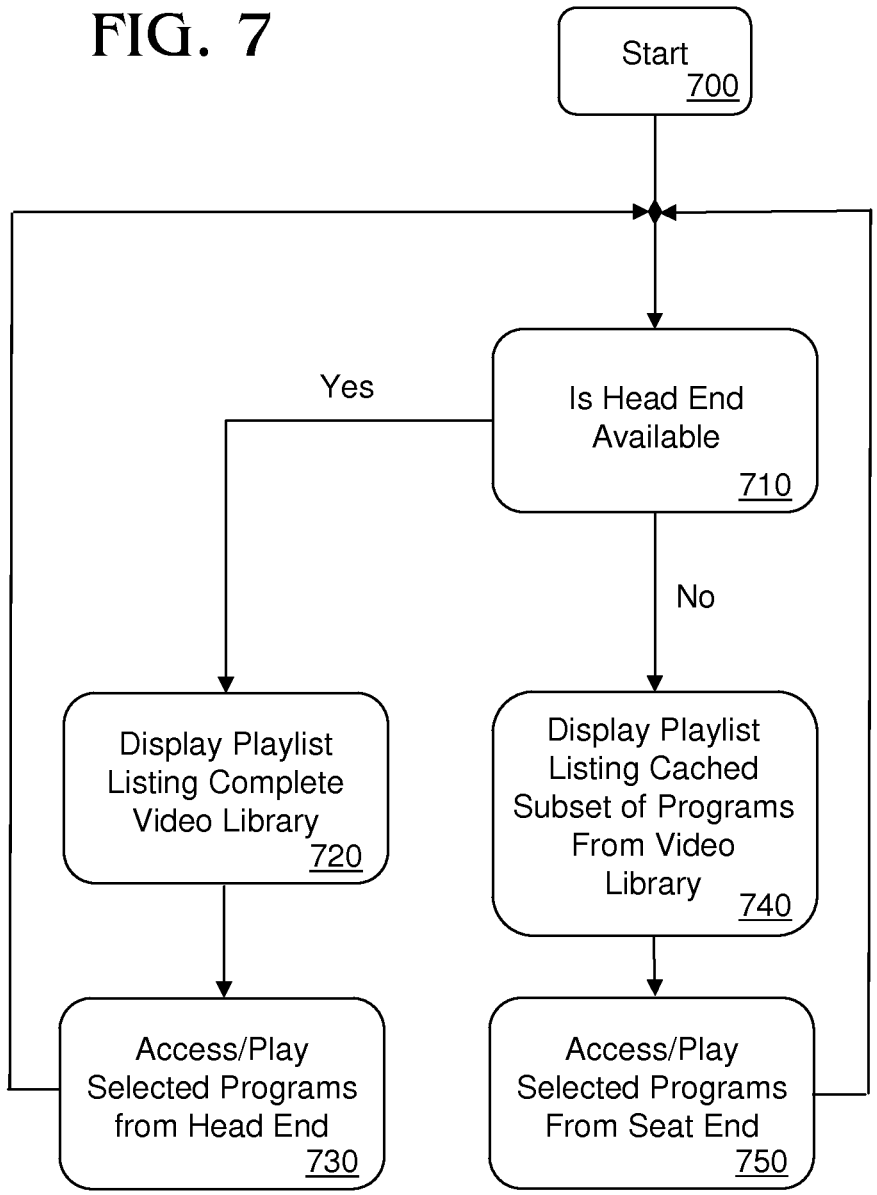

INFLIGHT ENTERTAINMENT SYSTEM WITH SELECTIVELY PRELOADED SEAT END VIDEO CACHES

CROSS-REFERENCE TO RELATED APPLICATION

This application claims the benefit of U.S. provisional application No. 61/575,849 entitled "INFLIGHT ENTERTAINMENT SYSTEM WITH IN-SEAT CACHED CONTENT," filed on Aug. 30, 2011, the contents of which are incorporated herein by reference.

BACKGROUND OF THE INVENTION

Inflight entertainment (IFE) systems have evolved significantly over the last 25 years. Prior to 1978, IFE systems consisted of audio-only systems. In 1978, Bell and Howell (Avicom Division) introduced a group viewing video system based on VHS tapes. In 1988, Airvision introduced the first in-seat video system allowing passengers to choose among several channels of broadcast video. In 1997, Swissair installed the first interactive video on demand (VOD) system. Currently, many IFE systems provide VOD with full digital video disc (DVD)-like passenger controls.

Most IFE systems are head end centric. FIG. 1 illustrates a legacy head end centric IFE system. The left side of the figure shows components that are found at the head end of the system. The right side of the figure shows components that are found at the passenger seats. The middle section of the figure shows components that are found between the head end and the seat end. These intermediate components are area distribution boxes (ADBs) or may be a combination of ADBs and zone interface units (ZIUs). The main purpose of the ADBs and ZIUs is to fan-out distribution of IFE system data from the head end to the seat end. Typically, ADBs connect to seat electronics boxes (SEBs) within each seat column, and each SEB is in turn connected to multiple video display units (VDUs) and passenger control units (PCUs) of a given seat group. An SEB may also distribute data to an SEB of an adjacent seat group in the same seat column. Alternatively, an ADB may be directly connected to VDUs and/or PCUs.

A more recent head end centric IFE system is shown in FIG. 2. This fiber optic head end centric IFE system leverages terrestrial VOD hardware and software, is implemented on avionics ruggedized militarized commercial off-the-shelf hardware and is packaged to minimize the number of distinct line replaceable units (LRUs) not only in a single aircraft but across an airline's entire fleet of aircraft (e.g., regional jets to jumbo jets). Head end servers and switches are integrated into server-switch units which are directly coupled over fiber to VDUs at the seat end. Serialized versions of this IFE system can be deployed to reduce fiber requirements.

In head end centric IFE systems of any flavor, the seat end equipment accesses selected prerecorded video programs (e.g., movies, television shows, video games, etc.) from the head end equipment "on demand" during the flight by sending program requests that are fulfilled by the head end equipment. In order for these IFE systems to remain fully operational, the head end equipment, distribution system and seat end equipment must all remain operational. Moreover, if the head end equipment or the distribution system becomes inoperable during the flight, the entire IFE system goes down. Unfortunately, this is a fairly common occurrence in many deployed head end centric IFE systems. To address these problems, seat end centric architectures have been proposed.

In proposed seat end centric IFE systems, such as the one illustrated in FIG. 3, seat end equipment hosts a complete library of prerecorded video programs, either within SEBs or VDUs. The head end equipment and the distribution system are used primarily for preloading the complete video library onto the seat end equipment. The IFE system remains operational during the flight as long as the seat end equipment remains powered, eliminating the risk that the IFE system will become inoperable in flight due to a head end equipment or distribution system failure. However, seat end centric IFE systems have the major drawback that the entire video catalog must be replicated for each seat (typically 200 to 500 seats) or at least each seat group, whereas in head end centric IFE systems replication is generally only performed a few times on head end equipment for the sake of redundancy. Therefore, proposed seat end centric IFE systems require far more storage capacity and loading time than head end centric IFE systems.

What is needed is an IFE system that continues in-flight operation through head end or distribution system failures, but without requiring the large multipliers in storage capacity and loading times of proposed seat centric IFE systems.

SUMMARY OF THE INVENTION

The present invention provides an IFE system having selectively preloaded seat end video caches. In the present invention, an IFE system preloads from head end equipment onto each of one or more seat end video caches a subset of prerecorded video entertainment programs from a library of prerecorded video entertainment programs stored on the head end equipment. Preloading is done independently of play requests made by passengers using the IFE system. The selected subset of prerecorded video entertainment programs is selected for each video cache using selection metrics such as program popularity, passenger demographics and/or passenger preferences (e.g., from pre-flight surveys). The same or a different subset may be selected for different passengers. As a result of selective preloading of the seat end video caches, if the head end equipment or the distribution system becomes inoperable during the flight, the IFE system is able to continue to deliver a limited offering of popular, demographically indicated and/or passenger preferred video entertainment from the seat end video caches. Moreover, sustained operation is achieved without requiring a large multiplier in storage capacity or loading time.

In one aspect of the invention, an IFE system comprises head end equipment having a library of prerecorded video entertainment programs and a selection metric stored thereon; and seat end equipment communicatively coupled with the head end equipment and having a video cache, wherein the head end equipment is configured to select a subset of the prerecorded video entertainment programs from the library using the selection metric and download the selected subset to the video cache independent of any play request made by a passenger using the IFE system.

In some embodiments, the seat end equipment is further configured to display a video playlist including prerecorded video entertainment programs from the library that are not within the selected subset when the head end equipment is available, and display a video playlist excluding prerecorded video entertainment programs from the library that are not within the selected subset when the head end equipment is unavailable.

In some embodiments, the seat end equipment is further configured to receive requests from a passenger to view prerecorded video entertainment programs from the library, access from the head end equipment and play requested video entertainment programs when the head end equipment is available, and access from the video cache and play requested video entertainment programs when the head end equipment is unavailable.

In some embodiments, the selection metric is a program popularity metric.

In some embodiments, the selection metric is an off-aircraft program popularity metric.

In some embodiments, the selection metrics is an on-aircraft program popularity metric.

In some embodiments, the selection metrics is an airline-specific popularity metric.

In some embodiments, the selection metric is a flight leg-specific popularity metric.

In some embodiments, the selection metric is a passenger demographics metric.

In some embodiments, the selection metric is a passenger demographics metric specific to an airline.

In some embodiments, the selection metric is a passenger demographics metric specific to a flight leg.

In some embodiments, the selection metric is a passenger demographics metric specific to a passenger assigned to a seat associated with the video cache.

In some embodiments, the selection metric is a passenger preference metric.

In some embodiments, the selection metric is a passenger preference metric specific to an airline.

In some embodiments, the selection metric is a passenger preference metric specific to a flight leg.

In some embodiments, the selection metric is a passenger preference metric specific to a passenger assigned to a seat associated with the video cache.

In another aspect of the invention, a method for selectively preloading a seat end video cache in an IFE system comprises the steps of selecting, by head end equipment, using a selection metric stored on the head end equipment, a subset of prerecorded video entertainment programs from a library of prerecorded video entertainment programs stored on the head end equipment; and downloading, from the head end equipment to a video cache of seat end equipment, independent of any play request made by a passenger using the IFE system, the selected subset.

These and other aspects will be better understood by reference to the following detailed description taken in conjunction with the drawings that are briefly described below. Of course, the invention is defined by the appended claims.

BRIEF DESCRIPTION OF THE DRAWINGS

FIG. 7 shows a method for accessing a prerecorded video entertainment program on seat end equipment in some embodiments of the invention.

DETAILED DESCRIPTION OF A PREFERRED EMBODIMENT

Figure 1:
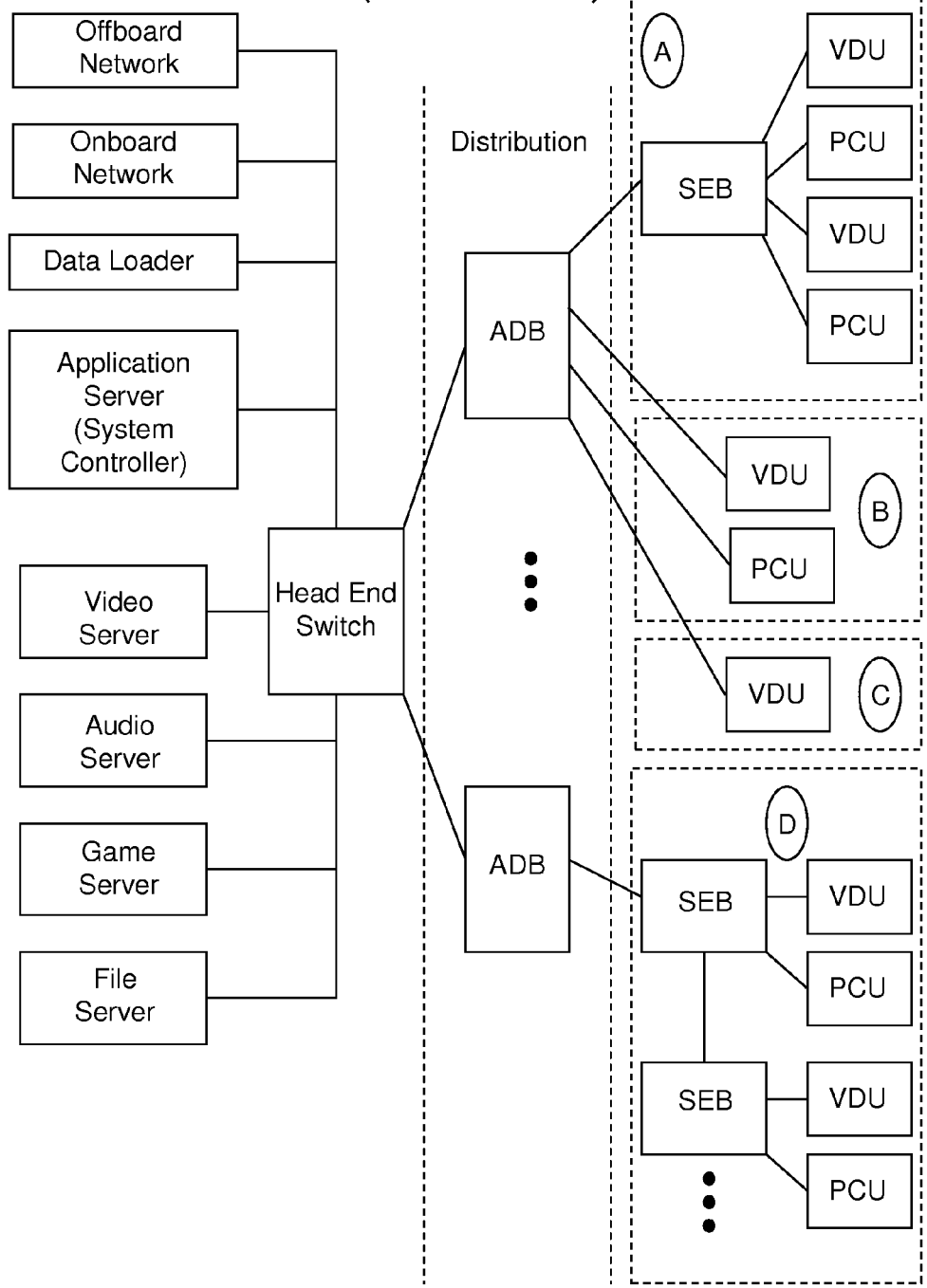
FIG. 1 shows a known head end centric IFE system.
Figure 2:
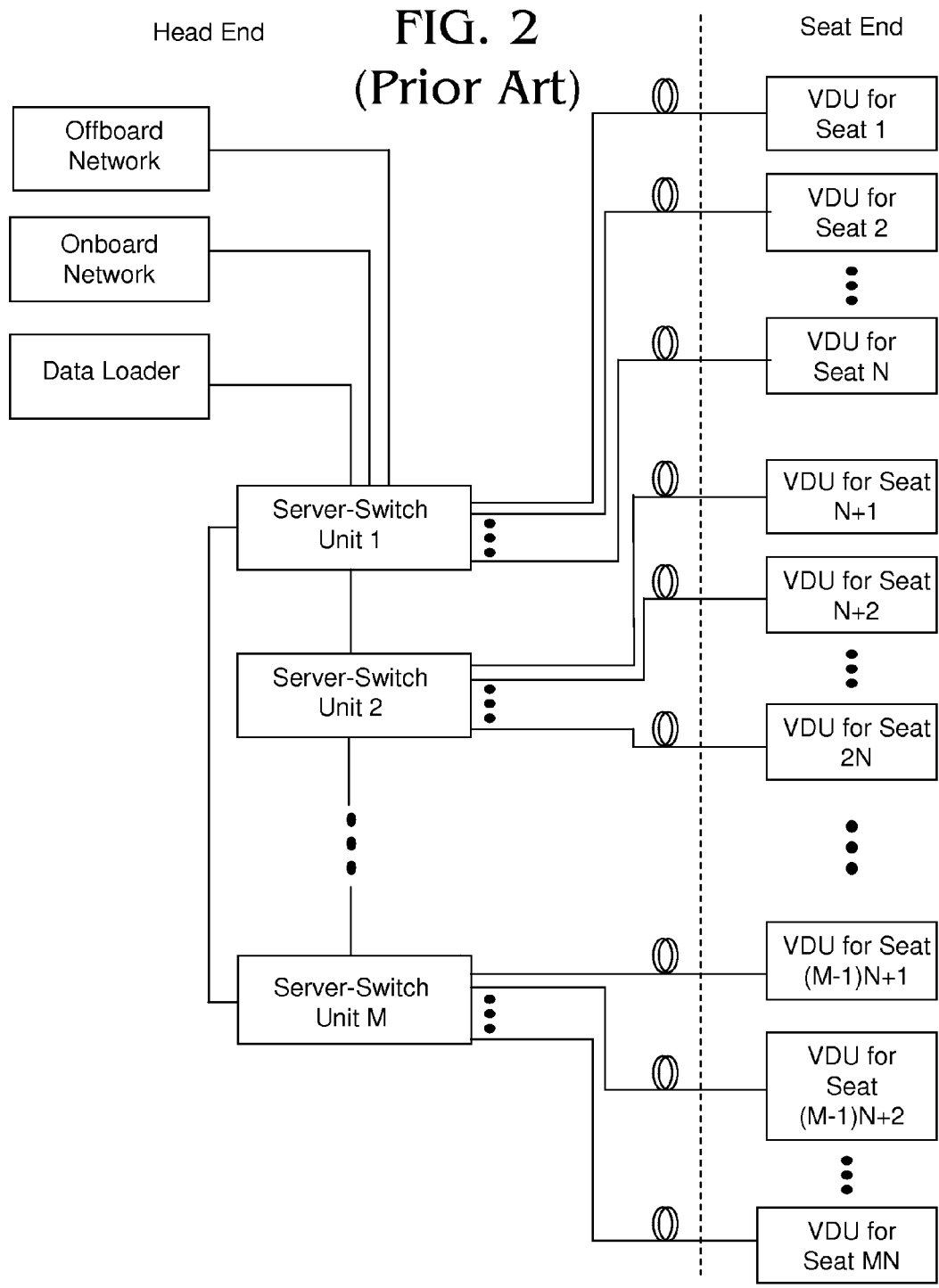
FIG. 2 shows a known fiber optic head end centric IFE system.
Figure 3:
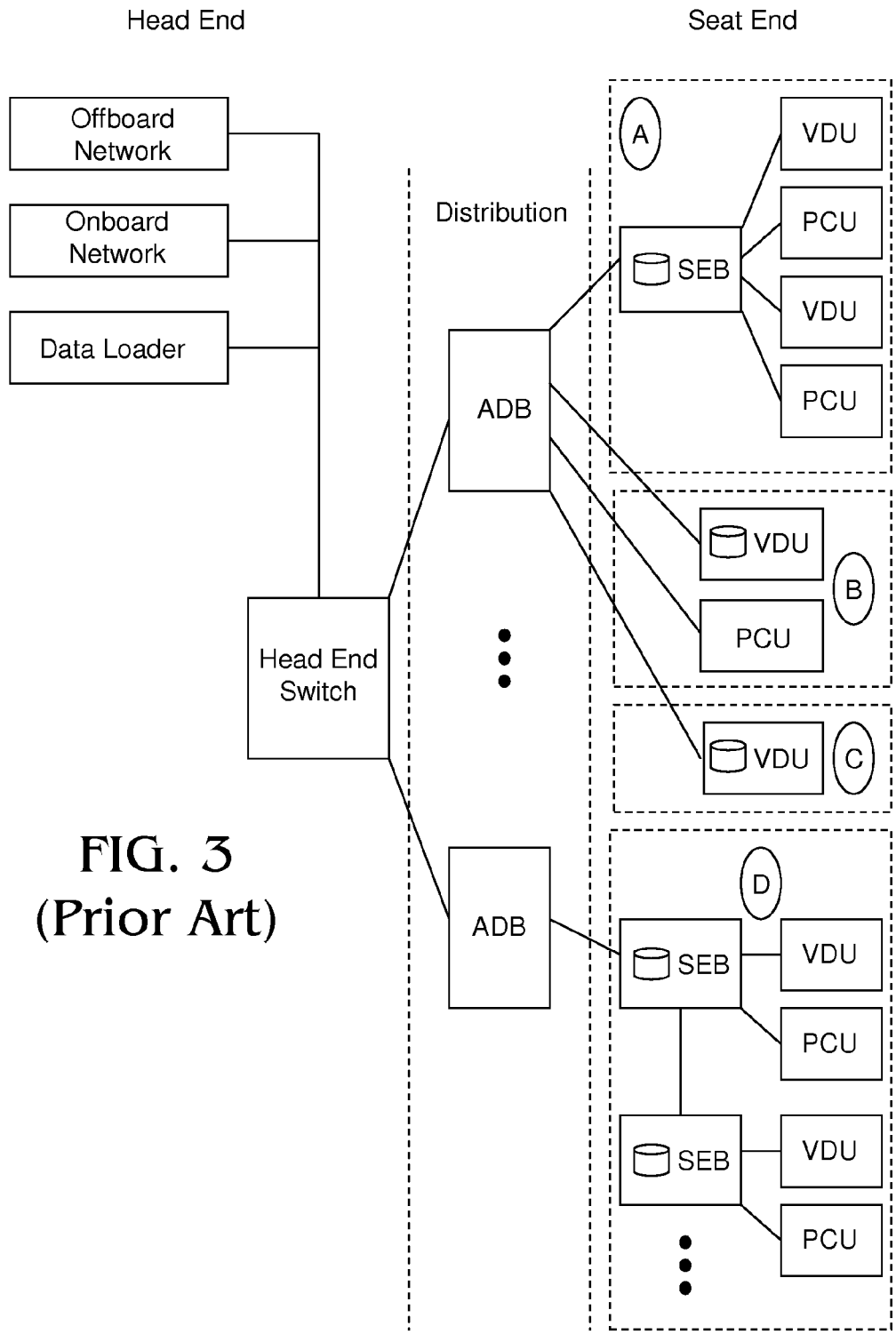
FIG. 3 shows a known seat end centric IFE system.
Figure 4:
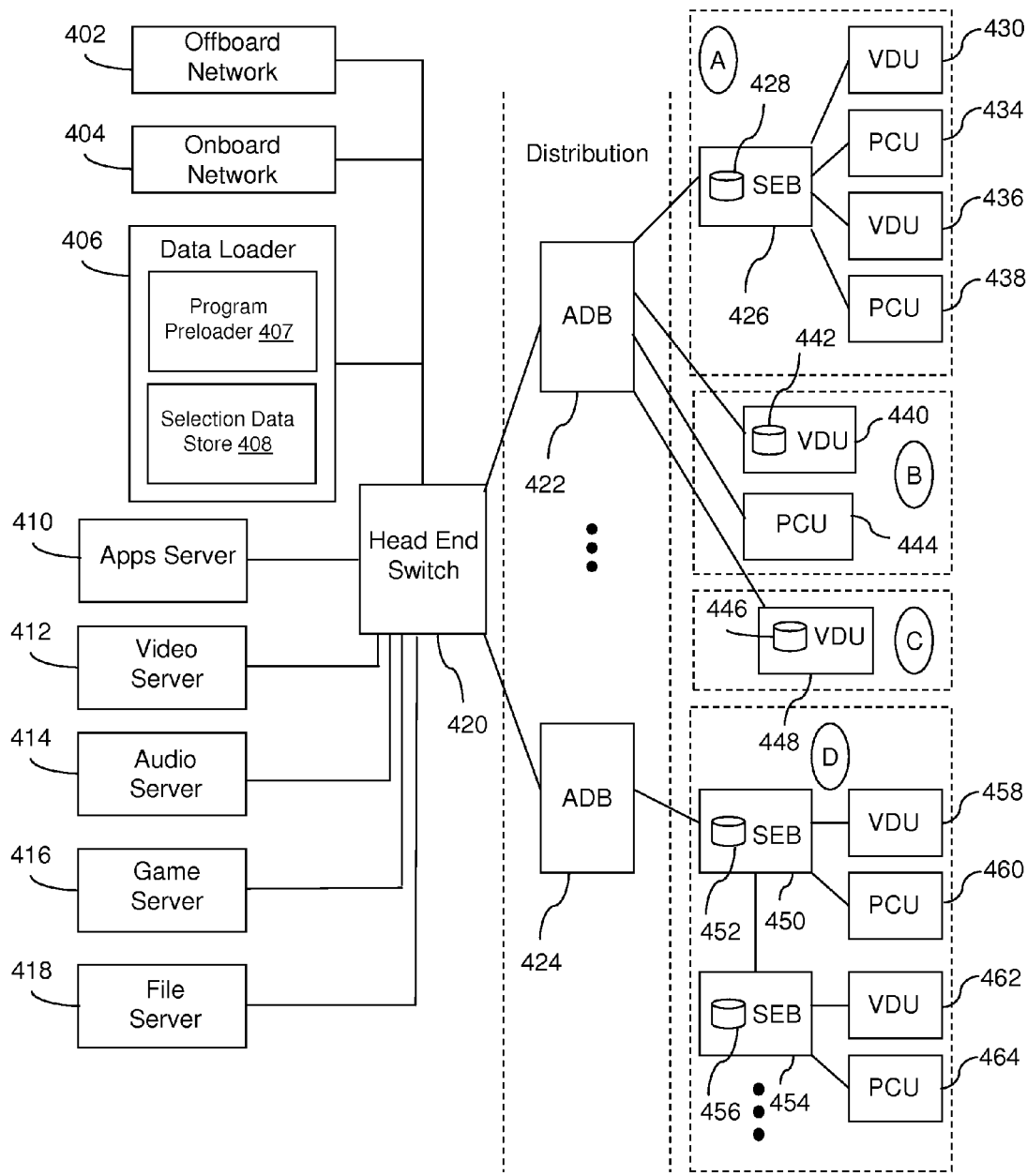
FIG. 4 shows an IFE system in some embodiments of the invention.

FIG. 4 shows an IFE system in some embodiments of the invention. The IFE system is deployed on an aircraft, such as a regional jet or jumbo jet. Elements of the IFE system are summarized below and may be implemented in software under microprocessor control, custom circuitry, or a combination thereof.

The IFE system includes the following head end equipment: Offboard network 402, onboard network 404, data loader 406, applications server 410, video server 412, audio server 414, game server 416, file server 418 and head end switch 420.

Offboard network 402 communicates with a terrestrial network over a satellite-based or ground-based wireless link. Offboard network 402 is connected to a head end switch 420 via a network cable. In some embodiments, offboard network 402 is a bidirectional network that provides the IFE system with terrestrial network access (broadband connectivity). In some embodiments, offboard network 402 is a unidirectional network that provides the IFE system with access to off-aircraft broadcast data sources such as satellite television (broadcast video).

Onboard network 404 provides the IFE system with access to content and data other than prerecorded video entertainment programs, such as reading light control, flight attendant call and flight information for applications such as moving maps. Onboard network 404 is connected to head end switch 420 via a network cable.

Data loader 406 facilitates selection and download of prerecorded video entertainment programs to seat end video caches, facilitates key updates and facilitates transaction data transfers. Data loader 406 acquires a library of prerecorded video entertainment programs through a removable disk or tape inserted into data loader 406, a portable disk drive or tape drive temporarily connected to a video server 412, upload via offboard network 402, upload via a wireless local area network (LAN) or upload via another wireless link. The prerecorded video entertainment programs in the video library include, for example, movies, TV shows and video games. The video library is stored on head end equipment, such as one or more of data loader 406 and servers 410, 412, 414, 416, 418. Data loader 406 is connected to head end switch 420 via a network cable.

Data loader 406 includes a program preloader 407. Independent of any play request made a passenger using the IFE system, program preloader 407 selects for download to video caches 428, 442, 446, 452, 456 on SEBs 426, 450, 454 and VDUs 440, 448 subsets of prerecorded video entertainment programs from the video library at the head end. The subsets may be updated for each flight, generally before allowing passengers on the flight to access to the IFE system. The same subset or different subsets may be selected for different ones of video caches 428, 442, 446, 452, 456 based on selection metrics stored in a selection data store 408. Accordingly, the subset may be personalized for each passenger, if desired. The selection metrics may include, for example, program popularity, passenger demographics and/or passenger preferences that may be received from various sources and applied to determine which prerecorded video entertainment programs are selected and downloaded to a given one of video caches 428, 442, 446, 452, 456. Program preloader 407 may receive updates to selection metrics periodically or continually from offboard network 402, onboard network 404, a removable disk or tape inserted into data loader 406, administrative input, VDUs 430, 436, 440, 446, 458, 462 and/or PCUs 434, 438, 444, 460, 464. In addition, selection metrics may be commingled with the prerecorded video entertainment programs on the removable/portable storage media through which data loader 406 acquires programs.

Program popularity selection metrics stored in selection data store 408 may reflect off-aircraft popularity of prerecorded video entertainment programs, on-aircraft popularity of prerecorded video entertainment programs, popularity of prerecorded video entertainment programs on a specific airline and/or popularity of prerecorded video entertainment programs on a specific flight leg (e.g., between Los Angeles and San Francisco).

Passenger demographic and passenger preference selection metrics may reflect demographics and preferences specific to an airline, a flight leg and/or a passenger assigned to a seat associated with one of video caches 428, 442, 446, 452, 456. Passenger preference selection metrics may include, by way of example, language and subject matter preferences gleaned from a passenger's responses to pre-flight survey questions and/or content selection on past flights.

Once a subset of prerecorded video entertainment programs from the video library has been selected for one or more of video caches 428, 442, 446, 452, 456, the selected subset is downloaded via head end switch 420 to the one or more of video caches 428, 442, 446, 452, 456 whereon the prerecorded video entertainment programs are stored. In some embodiments, all of video caches 428, 442, 446, 452, 456 receive and store the same prerecorded video entertainment programs. In other embodiments, video caches 428, 442, 446, 452, 456 receive and store different prerecorded video entertainment programs. Moreover, in some embodiments, the selected prerecorded video entertainment programs are downloaded directly from data loader 406, whereas in other embodiments, data loader 406 may instruct one or more of servers 410, 412, 414, 416, 418 to download the selected prerecorded video entertainment programs.

Moreover, in some embodiments, data loader 406 keeps a log of which prerecorded video entertainment programs are stored on which video caches 428, 442, 446, 452, 456. When one of video caches 428, 442, 446, 452, 456 is updated, data loader 406 causes to be downloaded to the one of video caches 428, 442, 446, 452, 456 a "delta package" that includes only selected video entertainment programs that are not already stored in the video cache.

Application server 410 is a system controller that provides content management, channel packaging, transaction processing, billing system integration, services management, provisioning integration, system administration and management, encryption management (e.g., key servers, authentication, etc.), software client management and server integration for audio, video, gaming and file servers. Application server 410 is connected to head end switch 420 via a network cable.

Video server 412 provides VOD, near-VOD, pay-per-view, network personal video recorder and broadcast video services. In some embodiments, video server 412 and audio server 414 are integrated into a single audio/video on demand server. Video server 412 is connected to head end switch 420 via a network cable.

Audio server 414 provides audio on demand and broadcast audio services. Audio server 414 is connected to head end switch 420 via a network cable.

Game server 416 provides logic, programming and dynamically delivered web pages for browser-based games. Game server 416 is connected to head end switch 420 via a network cable.

File server 418 provides caching of Internet content and user data and maintaining user profile data. File server 418 is connected to head end switch 420 via a network cable.

Head end switch 420 interconnects head end equipment with ADBs 422, 424 over network cables. In some embodiments, there is more than one head end switch.

Between the head end equipment and seat end equipment is a distribution system including ADBs 422, 424. ADBs 422, 424 interconnect head end switch 420 and seat end equipment over network cables. ADBs 422, 424 provide signal regeneration and distribution of data.

Seat end equipment includes seat end LRUs, including SEBs 426, 450, 454, VDUs 430, 436, 440, 448, 458, 462 and PCUs 434, 444, 460, 464, in various arrangements.

Callout boxes A through D in FIG. 4 show different seat end equipment arrangements. A given IFE system deployment on an aircraft may use one or more of the illustrated arrangements.

In the arrangement shown in Callout Box A, ADB 422 is connected between head end switch 420 and SEB 426 over a network cable. ADB 422 distributes data to SEB 426 which generates raw pixel data that is fed to VDUs 430, 436 over network cables. SEBs 426 also generates raw audio and relays control data to PCUs 434, 438 over network cables.

In the arrangement shown in Callout Box B, ADB 422 is connected directly to VDUs 440 and PCU 444 over network cables. In this arrangement, the data processing performed by SEB 426 is integrated into VDU 440 and PCU 444.

In the arrangement shown in Callout Box C, ADB 422 is connected directly to VDU 448 over a network cable. In this arrangement, data processing performed by SEB 426 is integrated into VDU 448. Moreover, user interface features provided by PCU 444 are integrated into VDU 448. For example, VDU 448 provides a touch screen for receiving passenger input and an audio jack for transmitting audio output.

In the arrangement shown in Callout Box D, ADB 424 is connected to SEB 450 over a network cable. ADB 424 distributes data to SEB 450 which generates raw pixel data that is fed to VDU 458 over a network cable. SEB 450 also generates raw audio and relays control data to PCU 460 over a network cable. Moreover, SEB 450 distribute data to SEB 454 in an adjacent seat group in the same seat column over an additional network cable. A seat group typically includes three seats mounted to the same structure. SEB 454 generates raw pixel data and raw audio that is fed to VDU 462 and PCU 464 over network cables.

SEBs 426, 450, 454 are seat end LRUs that are generally mounted under passenger seats. SEBs 426, 450, 454 have network interfaces and processing units for seat groups. Each SEB typically supports three seats corresponding to a three-seat seat group. In some embodiments, seat end video caches that store prerecorded video programs reside within SEBs. For example, SEBs 426, 450 and 454 house seat end video caches 428, 452 and 456, respectively.

VDUs 430, 436, 440, 446, 458, 462 are seat end LRUs that are generally mounted to the back of passenger seats. VDUs 430, 436, 440, 446, 458, 462 have a physical display (e.g., flat panel display) for displaying video content and IFE system menus. Moreover, some IFE system have recently begun migrating electronics that were previously located in SEBs to VDUs to reduce the size of SEBs. For example, Callout Box B shows an arrangement where the SEB has been eliminated and VDU 440 is connected directly to ADB 422 over a network cable. VDU 440 provides SEB-type processing in this arrangement. Moreover, Callout Box C shows an arrangement where both the SEB and PCU have been eliminated and VDU 446 is connected directly to ADB 422 over a network cable. VDU 448 provides SEB-type processing in this arrangement and also provides user interface features conventionally performed by a PCU. For example, VDU 448 provides a touch panel for receiving user input and an audio jack for transmitting audio output. Seat end video caches may reside within VDUs. For example, VDUs 440, 448 house seat end video caches 442 and 448, respectively.

PCUs 434, 438, 444, 460, 464 are seat end LRUs that are generally fixed-mounted or tether-mounted to passenger armrests and provide user interface features for interacting with the IFE system. These features generally include volume control, channel control, reading light control, flight attendant call button control, VDU menu control and VDU menu selection.

Figure 5:
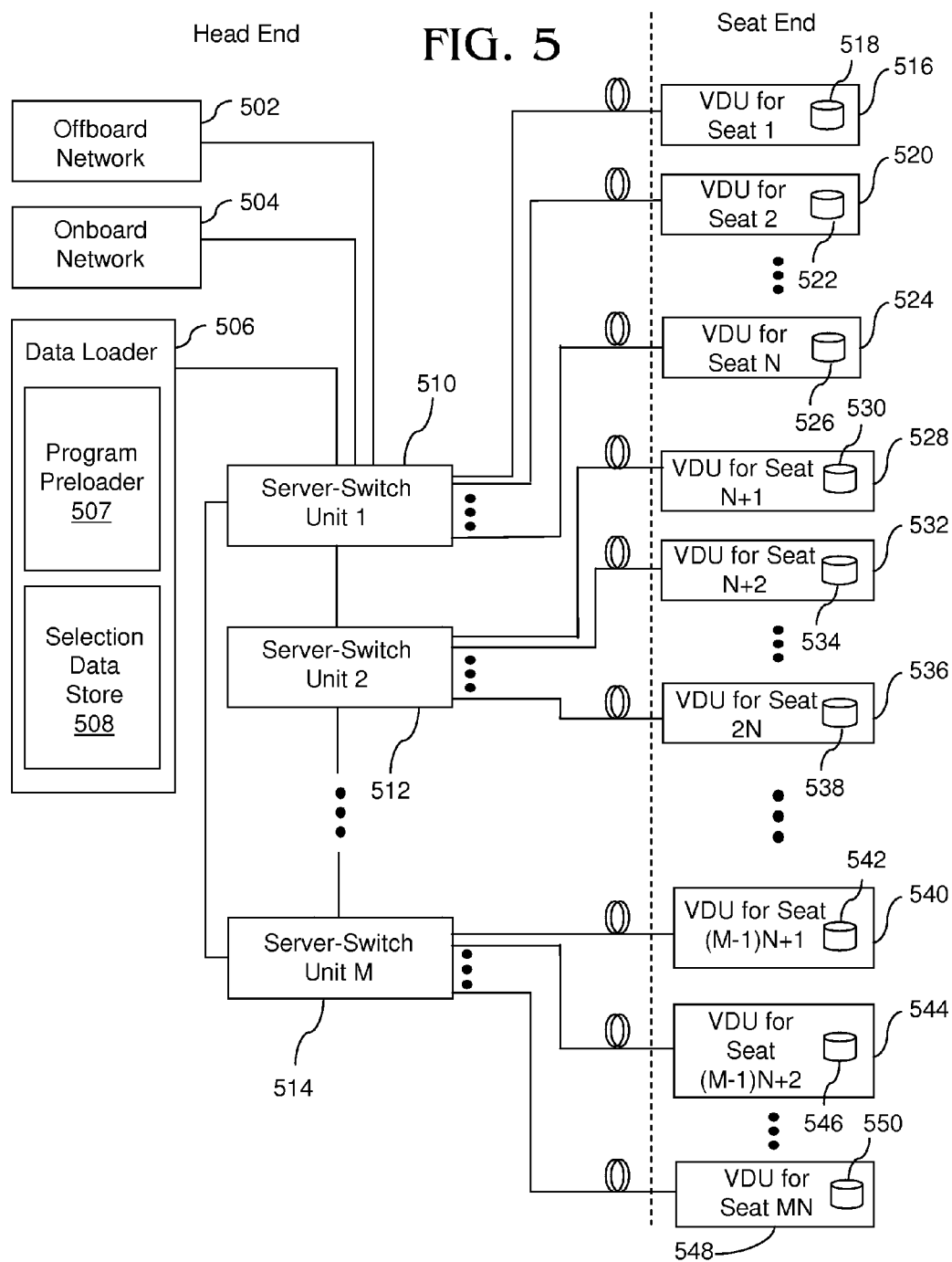
FIG. 5 shows a fiber optic IFE system in some embodiments of the invention.

FIG. 5 shows a fiber optic IFE system in some embodiments of the invention. In this IFE system, integrated server-switch units (SSUs) 510, 512, 514 are interconnected with one another via fiber optic network cables to form an aggregate head end server-switch system. An offboard network 502 and an onboard network 504 at the head end are connected directly to one or more of SSUs 510, 512, 514 via network cables. In addition, a data loader 506 at the head end is connected directly to one or more of SSUs 510, 512, 514 via a network cable. VDUs 516, 520, 524, 528, 532, 536, 540, 544, 548 have respective seat end video caches 518, 522, 526, 530, 534, 538, 542, 546, 550 and are connected directly to ones of SSU 510, 512, 514 via fiber optic cables. In this instance, server functionality (e.g., application server, audio server, video server, game server, file server, etc.) is integrated into SSUs 510, 512, 514 and seat end equipment consists in only VDUs 516, 520, 524, 528, 532, 536, 540, 544, 548.

Data loader 506 includes a program pre-loader 507. Independent of any play request by a passenger using the IFE system, program preloader 507 selects for download to video caches 518, 522, 526, 530, 534, 538, 542, 546, 550 on VDUs 516, 520, 524, 528, 532, 536, 540, 544, 548 subsets of prerecorded video entertainment programs from a video library at the head end. The subsets may be updated for each flight, generally before allowing passengers on the flight to access to the IFE system. The same subset or different subsets may be selected for different ones of video caches 518, 522, 526, 530, 534, 538, 542, 546, 550 based on selection metrics stored in a selection data store 508. The selection metrics may include, for example, program popularity, passenger demographics and/or passenger preferences that may be received from various sources and applied to determine which prerecorded video entertainment programs are selected and downloaded to a given one of video caches 518, 522, 526, 530, 534, 538, 542, 546, 550. Program preloader 507 may receive selection metrics from offboard network 502, onboard network 504 and/or VDUs 516, 520, 524, 528, 532, 536, 540, 544, 548. In addition, selection metrics may be commingled with the prerecorded video entertainment programs on removable/portable storage media through which data loader 506 acquires programs.

Figure 6:
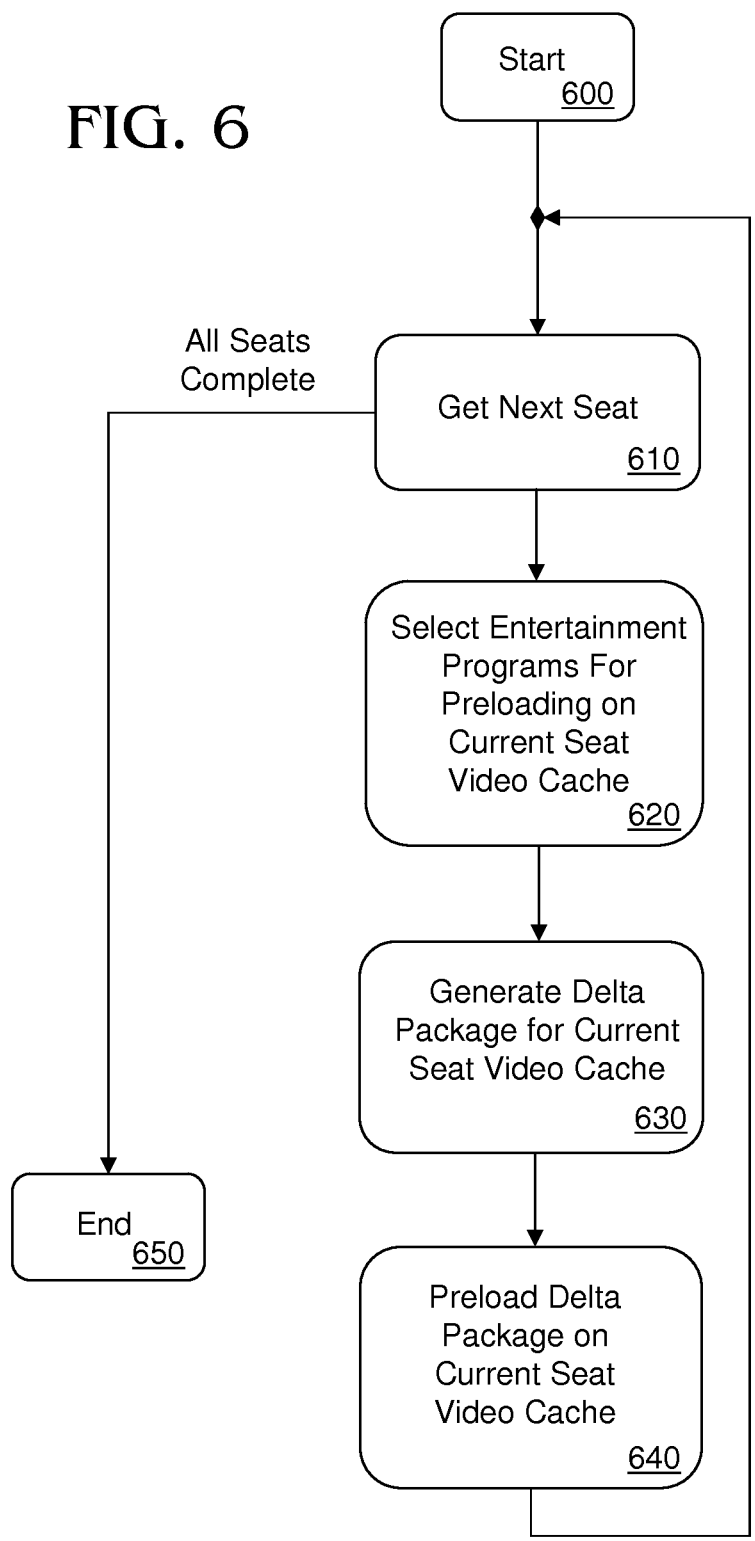
FIG. 6 shows a method for preloading seat end video caches with a subset of prerecorded video entertainment programs from a video library stored on head end equipment in some embodiments of the invention.

FIG. 6 shows a method for preloading seat end video caches in some embodiments of the invention. This method is performed by head end equipment (e.g., data loader). The method starts at Step 600 and an initial passenger seat is selected (610). A subset of prerecorded video entertainment programs in a video library stored on head end equipment is selected for download to a video cache associated with the initial passenger seat (e.g., based on popularity, passenger demographics and/or passenger preferences) (620). A delta package is then created including programs within the selected subset that are not already stored in the video cache (630) and the delta package is downloaded to the video cache whereon the subset of prerecorded video entertainment programs is stored (640). The selection/download process is repeated for the other passenger seats until entertainment content for all passenger seats has been preloaded, at which point the flow terminates (650). In some embodiments, this method is performed once for each flight, generally prior to allowing passengers access to the IFE system. In other embodiments, this method is performed continuously or periodically.

FIG. 7 shows a method for accessing a prerecorded video entertainment program on seat end equipment (e.g., VDUs) in some embodiments of the invention. This method is performed using seat end equipment (e.g., SEBs, VDUs). The method starts at Step 700 and a determination is made whether the head end system is presently available (710). If the head end system is available, a playlist that lists the complete video library stored at the head end is displayed on the seat end equipment (720). A video entertainment program is selected by a passenger from the playlist and a play request is sent to the head end, whereupon the selected video entertainment program is accessed from the head end and played on the seat end equipment (730). On the other hand, if the head end system is not available (e.g., inoperative or oversubscribed), a playlist that lists only the subset of prerecorded entertainment programs stored on the video cache associated with the seat end equipment is displayed on the seat end equipment (740). A video entertainment program selected by the passenger from the playlist is accessed locally from the video cache and played on the seat end equipment (750).

It will be appreciated by those of ordinary skill in the art that the invention can be embodied in other specific forms without departing from the spirit or essential character hereof. For example, in some embodiments, program preloaders may reside at the seat end. In these embodiments, each seat or seat group has an instance of the program preloader that continuously or periodically selects and causes prerecorded video entertainment programs to be downloaded to the video cache associated with the seat or seat group. The present description is therefore considered in all respects to be illustrative and not restrictive. The scope of the invention is indicated by the appended claims, and all changes that come within the meaning and range of equivalents thereof are intended to be embraced therein.

What is claimed is:

1. An inflight entertainment (IFE) system, comprising:
head end equipment having stored thereon a library of prerecorded video entertainment programs and a plurality of personalized selection metrics for a respective plurality of passengers on a flight determined without regard to input on the IFE system by any of the passengers after boarding the flight; and
seat end equipment communicatively coupled with the head end equipment and having a plurality of video caches and video displays for the respective passengers, wherein the head end equipment is configured to select from the library using the selection metrics a plurality of personalized subsets of prerecorded video entertainment programs for the respective passengers and download the selected subsets to the video caches for the respective passengers, wherein the seat end equipment is configured to determine availability of the head end equipment, display on the video displays for the respective passengers when the head end equipment is available first video playlists for the respective passengers whose offerings include prerecorded video entertainment programs beyond the downloaded subsets for the respective passengers and display on the video displays for the respective passengers when the head end equipment is unavailable second video playlists for the respective passengers whose offerings are limited to prerecorded video entertainment programs that are within the downloaded subsets for the respective passengers.

2. The IFE system of claim 1, wherein the seat end equipment is further configured to receive video play requests from the respective passengers through input on the seat end equipment, access requested video entertainment programs from the head end equipment and play the requested video entertainment programs accessed from the head end equipment on the video displays for the respective passengers when the head end equipment is available, and access requested video entertainment programs from the video caches for the respective passengers and play the requested video entertainment programs accessed from the video caches for the respective passengers on the video displays for the respective passengers when the head end equipment is unavailable.

3. The IFE system of claim 1, wherein the personalized selection metrics comprise passenger preference metrics.

4. The IFE system of claim 1, wherein the personalized selection metrics comprise passenger demographics metrics.

5. The IFE system of claim 1, wherein the personalized selections metrics are determined using passenger responses to pre-flight survey questions.

6. The IFE system of claim 1, wherein the personalized selection metrics are determined using passenger content selections on past flights.

7. The IFE system of claim 1, wherein the head end equipment is further configured to select the personalized subsets using a program popularity metric.

8. The IFE system of claim 1, wherein the head end equipment is further configured to select the personalized subsets using an on-aircraft program popularity metric.

9. The IFE system of claim 1, wherein the head end equipment is further configured to select the personalized subsets using an airline-specific popularity metric.

10. The IFE system of claim 1, wherein the head end equipment is further configured to select the personalized subsets using a flight leg-specific popularity metric.

11. In an inflight entertainment (IFE) system having head end equipment communicatively coupled with seat end equipment having a plurality of seat end video caches and a plurality of seat end video displays for a respective plurality of passengers on a flight, a method for preserving IFE system availability, comprising:

storing on the head end equipment a library of prerecorded video entertainment programs;

storing on the head end equipment a plurality of personalized selection metrics for the respective passengers determined without regard to input on the IFE system by any of the passengers after boarding the flight;

selecting by the head end equipment from the library, using the personalized selection metrics, a plurality of personalized subsets of the prerecorded video entertainment programs for the respective passengers;

downloading from the head end equipment to the seat end video caches for the respective passengers the selected subsets;

determining by the seat end equipment availability of the head end equipment;

displaying by the seat end equipment on the seat end video displays for the respective passengers, when the head end equipment is available, first video playlists for the respective passengers whose offerings include prerecorded video entertainment programs beyond the downloaded subsets for the respective passengers; and displaying by the seat end equipment on the seat end video displays for the respective passengers, when the head end equipment is unavailable, second video playlists for the respective passengers whose offerings are limited to prerecorded video entertainment programs that are within the downloaded subsets for the respective passengers.

12. The method of claim 11, further comprising:

receiving play requests for video entertainment programs from the respective passengers through input on the seat end equipment;

accessing requested video entertainment programs from the head end equipment and playing the requested video entertainment programs accessed from the head end equipment on the seat end video displays for the respective passengers when the head end equipment is available; and accessing requested video entertainment programs from the seat end video caches for the respective passengers and playing the requested video entertainment programs accessed from the seat end video caches for the respective passengers on the seat end video displays for the respective passengers when the head end equipment is unavailable.

13. The method of claim 11, wherein the personalized selection metrics comprise passenger preference metrics.

14. The method of claim 11, wherein the personalized selection metrics comprise passenger demographics metrics.

15. The method of claim 11, wherein the personalized selection metrics are determined using passenger responses to pre-flight survey questions.

16. The method of claim 11, wherein the personalized selection metrics are determined using passenger content selections on past flights.

17. The method of claim 11, wherein the head end equipment is further configured to select the personalized subsets using a program popularity metric.

18. The method of claim 11, wherein the head end equipment is further configured to select the personalized subsets using an on-aircraft program popularity metric.

19. The method of claim 11, wherein the head end equipment is further configured to select the personalized subsets using an airline-specific popularity metric.

20. The method of claim 11, wherein the head end equipment is further configured to select the personalized subsets using a flight leg-specific popularity metric.

* * * * *